United States Patent
Reidies et al.

(10) Patent No.: US 6,379,561 B1
(45) Date of Patent: Apr. 30, 2002

(54) METHOD OF, COMPOSITION AND KIT FOR OXIDIZING MATERIALS IN AN AQUEOUS STREAM

(75) Inventors: Arno H. Reidies, LaSalle; Shelley Dawn Corban, Princeton, both of IL (US); Larry Rader; Babe L. Wright, both of Beverly, WV (US)

(73) Assignee: Carus Corporation, Peru, IL (US)

( * ) Notice: Subject to any disclaimer, the term of this patent is extended or adjusted under 35 U.S.C. 154(b) by 0 days.

(21) Appl. No.: 09/609,555

(22) Filed: Jun. 30, 2000

(51) Int. Cl.$^7$ .................................................. C02F 1/72
(52) U.S. Cl. ..................... 210/758; 210/205; 252/175; 252/186.33; 252/186.44
(58) Field of Search ................................ 210/758, 205, 210/206; 252/175, 186.1, 186.33, 186.44

(56) References Cited

U.S. PATENT DOCUMENTS

| | | | |
|---|---|---|---|
| 4,455,236 A | * 6/1984 | Kim | |
| 4,961,751 A | 10/1990 | Eissele et al. | 8/111 |
| 5,118,429 A | 6/1992 | Anderson et al. | 210/758 |
| 5,152,804 A | 10/1992 | Eissele et al. | 23/313 |
| 5,167,834 A | * 12/1992 | Gallup | |
| 5,261,924 A | 11/1993 | Reidies et al. | 8/107 |
| 5,273,547 A | 12/1993 | Reidies | 8/107 |
| 6,004,522 A | * 12/1999 | England | |

* cited by examiner

*Primary Examiner*—Betsey Morrison Hoey
(74) *Attorney, Agent, or Firm*—Fitch, Even, Tabin & Flannery

(57) ABSTRACT

The invention is directed to an oxidizing composition of agglutinated particles comprising an alkali metal permanganate, a binder/coating agent of an alkali metal silicate and/or alkali metal aluminate and a filler such as clay, diatomaceous earth, talc, ground silica or zeolites. The invention also is directed to an oxidizing kit which includes a pervious container and the oxidizing composition. The invention also is directed to a method of oxidizing waste materials with the kit in a substantially aqueous moving fluid stream.

20 Claims, 2 Drawing Sheets

METHOD OF, COMPOSITION AND KIT FOR OXIDIZING MATERIALS IN AN AQUEOUS STREAM

FIELD OF THE INVENTION

This invention is directed to an oxidizing composition, a method of oxidizing waste materials in a moving substantially aqueous stream, and a kit which includes pellets of the oxidizing composition which permits the timed release of potassium and/or sodium permanganate in the moving substantially aqueous stream.

BACKGROUND OF THE INVENTION

Sewage treatment stations or streams which contain waste materials such as hydrogen sulfide or acid mine drainage which includes iron and manganese often are in remote areas or are in areas without adequate utilities such as power and water. This makes the use of chemical feed equipment impractical or impossible. The lack of adequate utilities, however, does not stop the need to treat streams having deleterious waste materials. These waste materials may be controlled through an oxidation reaction between sodium or potassium permanganate and hydrogen sulfide or the iron or manganese compounds in acid mine drainage. With electro-mechanical metering equipment, the permanganate may be added to the water containing the waste which is to be oxidized. But without adequate power or water immediately available, this equipment cannot be used.

Timed or controlled release of potassium or sodium permanganate into the waste water stream would provide a solution to providing permanganate to oxidize waste. Known products for the timed release of permanganate do not solve the problem of metering sufficient permanganate into a stream to oxidize waste such as hydrogen sulfide and thereby reduce the noxious odor of that gas into the environment. U.S. Pat. Nos. 5,152,804 and 4,961,751 to Eissale et al. describe cement pellets which include permanganate crystals distributed in a cured hydrated mineral cement such as gypsum, Sorel cement, Portland cement and Pozzolan cement. These patents describe using these permanganate cement pellets as "frosting stones" for bleaching denim garments where the action of the stones on the garments provided the garments with a "used" or "frosted" style. The stones abrade against the garment as well as other stones as the damp garments would be tumbled with the stones to bleach and abrade the garment. These cement stones are too hard and resistant to disintegration to provide a proper timed release of permanganate in a water stream. U.S. Pat. No. 5,261,924 to Reidies et al. describes a layered composition with a hardened core and a cement outer layer. The core in the product of the '924 patent includes permanganate, a hydrated cement or a hardened binder/clay combination. The outer layer has Sorel cement or gypsum. While the patent describes a binder/clay combination, that combination is only an inner core of a pellet. The core of the pellet is encased in a very hard cement outer layer of Sorel cement or gypsum. Again this product is too hard and resistant to disintegration to provide a proper timed release of permanganate in a water stream. U.S. Pat. No. 5,273,547 to Reidies describes pellets of Sorel cement with permanganate distributed at the core, but not at the surface of the pellets. This product, as with the products described in the other patents described herein, is too hard and resistant to disintegration to provide a proper timed release of permanganate in a water system for the oxidative destruction of waste such as $H_2S$.

OBJECTS OF THE INVENTION

It is an object of the invention to provide an oxidizing product which will provide a proper timed release of permanganate into a moving aqueous stream to oxidize undesired materials in the stream.

It is another object of the invention to provide a kit for use in controlling undesired materials and for providing the timed release of permanganate in an aqueous stream.

It is yet another object of the invention to provide a method for controlling undesired materials and provide the timed release of permanganate in an aqueous stream.

These and other objects of the invention will become apparent upon reference to the specification herein.

SUMMARY OF THE INVENTION

This invention is directed to an oxidizing composition of agglutinated particles comprising an alkali metal permanganate, a binder/coating agent of an alkali metal silicate and/or alkali metal aluminate and a filler such as clay, diatomaceous earth, talc, ground silica or zeolites. This invention also is directed to an oxidizing kit which includes a pervious container and the oxidizing composition. This invention also is directed to a method of oxidizing waste materials with the kit in a substantially aqueous moving fluid stream. The oxidizing composition is uniquely composed of small pellets, briquettes or other agglutinated masses or particles such that when a plurality of the particles are in a pervious container which container is in a moving substantially aqueous stream, the particles will slowly disintegrate and release the permanganate over time in the stream. With the disintergration of the product, no residual carrier of the permanganate is left to create a disposal problem. The released permanganate will oxidize waste materials in the stream such as hydrogen sulfide, or will oxidize iron and/or manganese in acid mine drainage. Further, the invention includes a method of reducing materials, especially undesired effluent materials in a substantially aqueous moving fluid stream.

According to the method of the invention, the container of the kit holds a plurality of pellets of the oxidizing composition and is put into the moving stream which carries the material which is to be oxidized by the alkali metal permanganate in the pellets. The moving stream moves the pellets in the container against each other and abrades the surface of the pellets sufficiently such than manganese dioxide will not form on the pellet surface and inhibit the oxidation reaction of the permanganate and the material in the stream being oxidized. The abrasion and moving action of the stream is effective for disintegration of the pellets and provides timed release of the particulate permanganate in the moving stream. The plurality of pellets, pellet size and surface area, the balance between amounts of alkali metal permanganate, binder/coating agent and filler in the pellet, the speed of the moving stream and the substantially aqueous environment all combine to provide a suitable disintegration of the pellet and the timed release rate of permanganate to effect the oxidation reaction.

The oxidizing composition comprises agglutinated particles or pellets comprising from about 60 to about 80 weight percent sodium or potassium permanganate distributed throughout the pellets which also comprise from about 10 to about 20 weight percent of a binder/coating agent which is an alkali metal silicate and/or alkali metal aluminate and from about 10 to about 20 weight percent of a filler. In an important aspect, the pellets or agglutinated particles have a size of from about ¼ inches to about 2 inches in diameter and are about 1 to about 3 inches long. In another important aspect, the amounts of sodium or potassium permanganate, binder/coating agent and filler clay are balanced with pellet size and number of pellets such that when a plurality of pellets are at least partially immersed in a substantially aqueous moving stream from about 0.5 to about 10 pounds of permanganate will be delivered into the aqueous environment to oxidize materials therein. In another important aspect, the binder/coating agent is sodium silicate also known as water glass.

The kit of the invention comprises the agglutinated pellets and a pervious container which is not reactive with the sodium or potassium permanganate or the waste material to be oxidized in the aqueous stream. The container may be a walled container with holes or a bag with holes or made of mesh or a net which holes or net permits the flow of the substantially aqueous stream through the container to contact, move, disintegrate the pellets, dissolve the permanganate and time release the permanganate in the aqueous environment at a rate of from about 0.5 to about 10 pound of sodium and/or potassium permanganate per day. In an important aspect, the container is a flexible mesh bag made of a material such as polyester which will not decompose in an aqueous permanganate environment, as contemplated by the timed release of permanganate and permanganate concentrations described herein, and which permits movement of the pellets in an aqueous stream. In another important aspect, where waste water containing hydrogen sulfide is treated, the composition and the size of the pellets should be balanced to effect from about 4 to about 9 pounds of sodium and/or potassium permanganate per day, and in a very important aspect, from about 6 to about 8 pounds of sodium and/or potassium permanganate per day.

DETAILED DESCRIPTION OF THE INVENTION

Definitions

"Pellet" or "pellets" means any agglutinated mass or masses which may be spherical, cylindrical or pillow shaped which may be pelletized through extrusion, which may be briquetted or otherwise agglomerated or molded.

"Non-layered pellet" means a pellet which has sodium permanganate or potassium permanganate distributed throughout the pellet in a generally random way where the permanganate is not concentrated in one volume part of the pellet, such as a layer near the surface of the pellet.

"Non-reactive container" means a container made of or coated with a material which does not react with permanganate such as polyethylene, polypropylene, chlorinated polyvinyl chloride, polyvinyl chloride or polyester.

"Clay" means natural mineral mixtures based upon silica and alumina such as bentonite and attapulgite clay.

"Substantially aqueous" means a liquid material which comprises at least 70 weight percent water.

"Alkali metal aluminate" means sodium and/or potassium aluminates.

"Alkali metal silicate" means sodium and/or potassium silicate.

Figure 1:
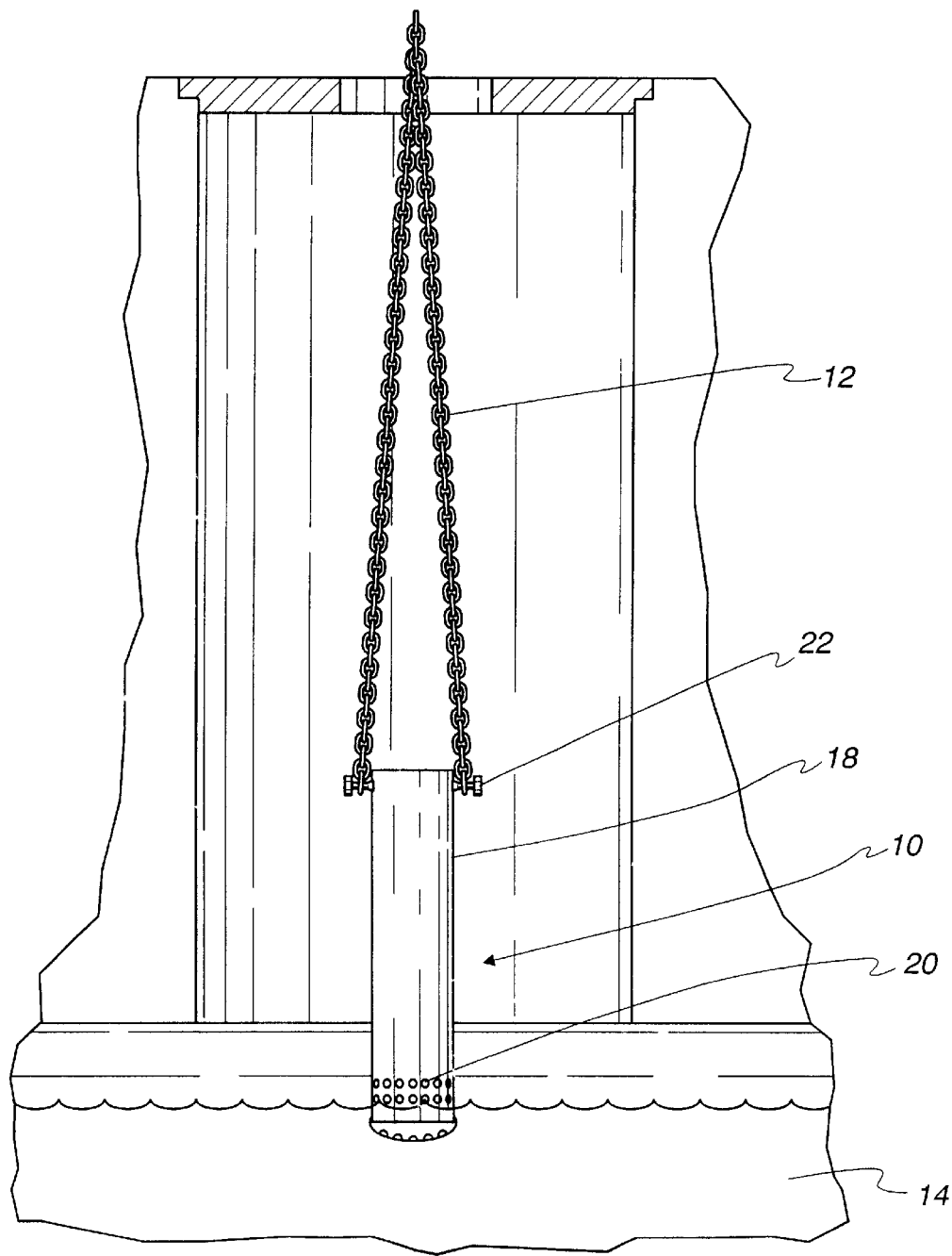
FIG. 1 is a schematic illustration of a pervious container which includes agglutinated pellets extended into a waste water line.

As can be seen in FIG. 1, the invention includes a kit 10 suspended on a chain or rope 12 into a waste water stream 14 from a surface access cover to the stream, such as a manhole cover 16. When in use, the kit includes agglutinated pellets (not shown but hereinafter described in more detail) in a pervious container 18 which includes side holes 20 which are at least partially submerged below the surface of the waste water stream. The container also has a bottom cap 22 with bottom holes 24 to permit water to drain from the container when it is removed from the water stream. The container has bolts 26 or some other fastener or hole to which a chain or rope can be affixed to fasten the suspending rope or chain to the container. The container is a non reactive container. The holes in the container are in size and number to be effective for permitting the flow of water through the container to permit the water to contact agglutinated pellets in the container.

Figure 2:
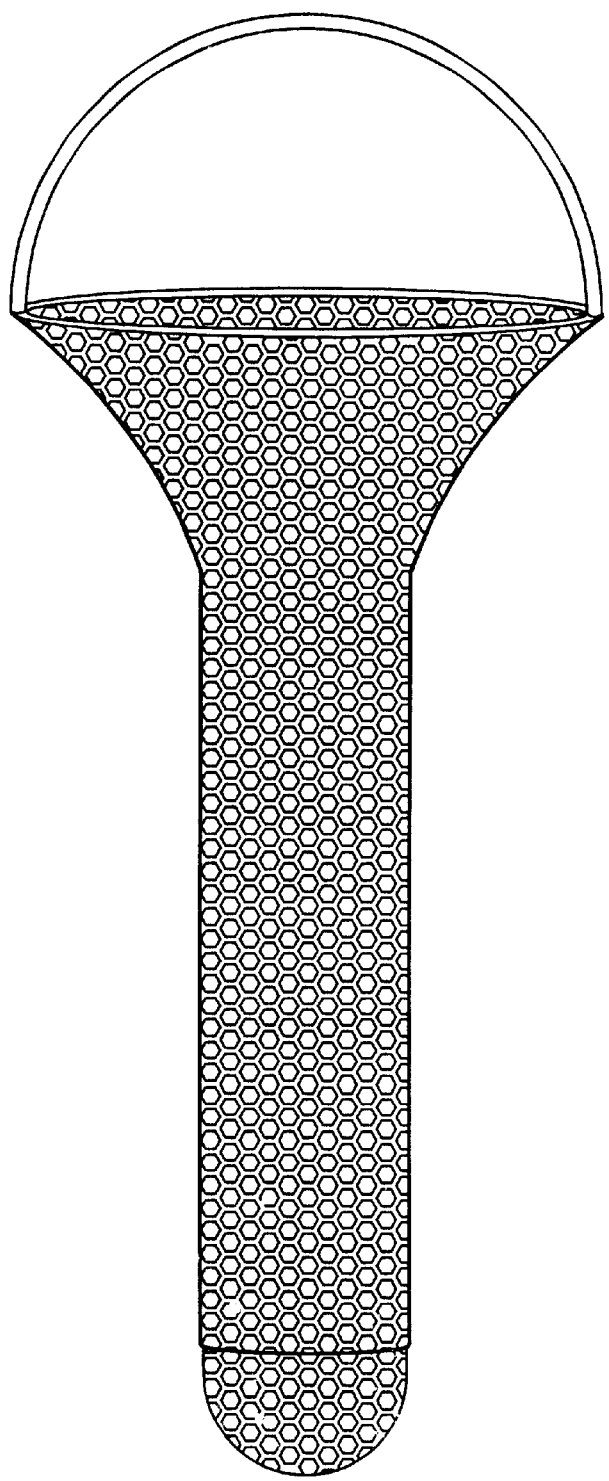
FIG. 2 is a mesh bag which may be filled with agglutinated pellets according to the invention.

As seen in FIG. 2, the container 18 may be a cylindrical polyvinyl chloride pipe about six inches in diameter and three feet in length. A container of this size and type may be filled with about 25 pounds of agglutinated pellets which will gravity feed down the pipe as the lower pellets dissolve after the container is lowered into the aqueous stream and the pellets are exposed to water.

As seen in FIG 2, in an important aspect, the container is a mesh bag 40 which has a generally cylindrical shape for its central body portion 41. The bottom 42 of the bag is rounded or in the shape of a hemisphere with a reinforcing side strip 44 running the length of the cylindrical bag and circular bottom reinforcing strip 46 circumferentially around the bottom of the bag. This bottom reinforcing strip joins and reinforces the hemispherical bottom with the cylindrical body portion of the bag. The top portion of the bag has a wide mouth 48 which flares open from the cylindrical body in a frusto conical shape 50. A handle 52 extends from a reinforced edge 54 of the mouth 48. For strength, the handle over laps or is an integral part of the reinforcing side strip 44. The wide mouth 48 of the bag is important because its diameter is greater than a 5 or 10 gallon container or bucket in which the agglutinated pellets are shipped.

In practicing the invention, the wide mouth of the bag is slid over the bucket containing the pellets which bucket then is tipped or inverted to fill the bag which then is lowered into a waste water stream and is extended therein by the handle 52 which may be tied to a rope or chain. The rope or chain is extended from the surface or ground via a manhole 16 as seen in FIG. 1. The bag is made of a material which is not substantially reactive with permanganate such as polyester, polypropylene, polyethylene, polyvinyl chloride, and chlorinated polyvinyl chloride-type polymers.

The oxidizing composition comprises agglutinated particles or pellets comprising from about 60 to about 80 weight percent sodium or potassium permanganate distributed throughout the pellets which also comprise from about 10 to about 20 weight percent of a binder/coating agent which is an alkali metal silicate and/or alkali metal aluminate and from about 10 to about 20 weight percent of a filler. The permanganate is distributed through the pellets. The filler and binder are also mixed and do not form layers in the pellet. In an important aspect, the pellets or agglutinated particles have a size of from about ¼ inches to about 2 inches in diameter and are about 1 to about 3 inches long. In another important aspect, the amounts of sodium or potassium permanganate, binder/coating agent and filler clay are balanced with pellet size and number of pellets such that when a plurality of pellets are at least partially immersed in a substantially aqueous moving stream from about 0.5 to about 10 pounds of permanganate will be delivered into the aqueous environment to oxidize materials therein. The filler may be diatomaceous earth, talc, ground silica, or zeolites. In an important aspect, the filler is clay.

The agglutinated pellets may be made by extrusion, molding, briquetting, and disc pelletization as are known. When briquetting or tabletting a small amount of calcium and/or magnesium stearate (<1%) is added to help form a more cohesive briquette. By way of example, for an extruded product, particulate or powdered $KMNO_4$, sodium silicate and bentonite clay are dry mixed and water sufficient to form an extrudable dough is added and mixed with the dry mix. Thereafter the dough is extruded into pellets.

EXAMPLE—A CASE STUDY

A sewer authority operates a 250,000 gpd pump station near a developed area of the township. Because adequate utilities (electrical power and water) are not readily available at this remote site, the pump station is left untreated. However, the authority is concerned because periods of low flow, the station is producing hydrogen sulfide readings as high as 82 ppm, even during cool spring water.

Due to the lack of adequate utilities, the use of chemical feed equipment for standard potassium permanganate odor control treatment is impractical. As the weather grew hotter in early summer, the controlled release product of the invention is used at the remote pump station. In the spring, approximately 40 lbs. of the extruded product having a pellet size of about ¾ inches in diameter and 1–3 inches long which pellets contain about 80 percent weight percent potassium permanganate, 10–20 percent sodium silicate (water glass), and 5–10 weight percent of clay are placed in a polyester mesh bag. No mixing of the pelleted product is required. The bottom of the bag is then lowered 6 inches below the water level at the inlet to the pump station. A meter is installed to measure hydrogen sulfide in the station. Over the next 24 hours, $H_2S$ readings range from 0–12 ppm (down from 82 ppm), resulting in a 74% drop in average $H_2S$ levels compared to readings obtained in the spring.

Two days later, the pelleted product feed is increased by lowering the bag an additional 2 inches into the water, for a total submersion of 8 inches. No additional product is added to the bag. Five days later, meter readings are again taken over the next 24 hours. Hydrogen sulfide levels during the period register from 0–5 ppm. These levels represent an additional 23% drop in average $H_2S$ levels, for a total reduction of 97% compared to the spring readings. The application of the pelleted product of the invention reduces hydrogen sulfide to below detectable levels for nearly 19 of the 24 hours and for extended periods of up to 9 hours.

Although the invention has been described with regard to its preferred embodiments, it should be understood that various changes and modifications as would be obvious to one having the ordinary skill in this art may be made without departing from the scope of the invention which is set forth in the claims appended hereto.

The various features of this invention which are believed new are set forth in the following claims.

What is claimed is:

1. An oxidizing composition which comprises a plurality of agglutinated pellets, the pellets comprising:
    from about 60 to about 80 weight percent sodium or potassium permanganate;
    from about 10 to about 20 weight percent of a binder/coating agent selected from the group consisting of an alkali metal silicate, alkali metal aluminate and mixtures thereof; and
    from about 10 to about 20 weight percent of a filler, the permanganate being distributed throughout the pellets.

2. The oxidizing composition of claim 1 wherein, the amounts of sodium or potassium permanganate, binder/coating agent and filler are balanced with pellet size and number of pellets such that when a plurality of pellets are immersed into a substantially aqueous moving stream from about 0.5 to about 10 pounds of permanganate will be delivered into the aqueous environment.

3. The oxidizing composition of claim 1 wherein the binder/coating agent is sodium silicate.

4. The oxidizing composition of claim 2 wherein the binder/coating agent is sodium silicate.

5. The oxidizing composition of claims 1, 2, 3 or 4 wherein the pellets have a particle size in the range of from about ¼ inches to about 2 inches in diameter and the filler is selected from the group consisting of diatomaceous earth, talc, ground silica, zeolite and clay.

6. An oxidizing kit comprising:
    a plurality of pellets of an oxidizing composition; and
    a pervious container which is non-reactive with the oxidizing composition, the oxidizing composition comprising
        from about 60 to about 80 weight percent sodium or potassium permanganate,
        from about 10 to about 20 weight percent of a binder/coating agent selected from the group consisting of an alkali metal silicate, alkali metal aluminate and mixtures thereof,
        from about 10 to about 20 weight percent of a filler, the permanganate being distributed throughout the pellets, and
    wherein the pervious container is effective for permitting the flow of a substantially aqueous stream through the container to permit the stream to disintegrate the pellets and effect a timed release of the sodium or potassium permanganate into the water.

7. The kit of claim 6 wherein the amounts of sodium or potassium permanganate, binder/coating agent and filler are balanced with pellet size and number of pellets such that when the container with a plurality of pellets is immersed into a substantially aqueous moving stream from about 0.5 to about 10 pounds of permanganate per day will be delivered into the aqueous stream.

8. The kit of claim 6 wherein the binder/coating agent is sodium silicate.

9. The kit of claim 7 wherein the binder/coating agent is sodium silicate.

10. The oxidizing composition of claims 6, 7, 8, or 9 wherein the pellets have a particle size in the range of from about ¼ inches to about 2 inches in diameter and the filler is selected from the group consisting of diatomaceous earth, talc, ground silica, zeolite and clay.

11. A method for oxidizing at least one material in a substantially aqueous moving liquid stream, the method comprising:
    at least partially immersing a kit into the moving stream;
    the kit comprising a plurality of pellets of an oxidizing composition; and
    a pervious container which is non-reactive with the oxidizing composition, the oxidizing composition comprising
        from about 60 to about 80 weight percent sodium or potassium permanganate,
        from about 10 to about 20 weight percent of a binder/coating agent selected from the group consisting of an alkali metal silicate, alkali metal aluminate and mixtures thereof,
        from about 10 to about 20 weight percent of a filler, the permanganate being distributed throughout the pellets, and wherein the pervious container is effective for permitting the flow of a substantially aqueous stream through the container to permit the stream to disintegrate the pellets and effect a timed release of the sodium or potassium permanganate into the water.

12. A method for oxidizing at least one material in a substantially aqueous moving liquid stream, the method comprising:

at least partially immersing a kit into the moving stream, the kit comprising a plurality of non-layered pellets of an oxidizing composition; and a pervious container which is non-reactive with the oxidizing composition, the oxidizing composition comprising a permanganate selected from the group consisting of sodium permanganate, potassium permanganate and mixtures thereof, a binder/coating agent selected from the group consisting of an alkali metal silicate, alkali metal aluminate and mixtures thereof, and a filler selected, the permanganate being distributed throughout the pellets, and wherein the pervious container is effective for permitting the flow of the substantially aqueous stream through the container to permit the stream to disintegrate the pellets and effect a timed release of the permanganate into the water and the size of the pellets, the amounts of permanganate, binder/coating agent and clay filler being balanced to effect a timed release of permanganate into the water of from about 0.5 to about 10 pounds of permanganate per day.

13. A method of claim 12 wherein the oxidizing composition comprises from about 60 to about 80 weight percent the permanganate, from about 10 to about 20 weight percent of the binder/coating agent selected from the group consisting of an alkali metal silicate, alkali metal aluminate and mixtures thereof, from about 10 to about 20 weight percent of a filler.

14. The method of claim 12 wherein the binder/coating agent is sodium silicate.

15. The method of claim 13 wherein the binder/coating agent is sodium silicate.

16. The method of claims 12, 13, 14 or 15 wherein the filler is selected from the group consisting of diatomaceous earth, talc, ground silica, zeolite and clay.

17. The oxidizing composition of claims 12, 13, 14 or 15 wherein the pellets have a particle size in the range of from about ¼ inches to about 2 inches in diameter.

18. A method for oxidizing hydrogen sulfide in a substantially aqueous moving liquid stream, the method comprising:

at least partially immersing a kit into the moving stream, the kit comprising a plurality of non-layered pellets of an oxidizing composition; and a pervious container which is non-reactive with the oxidizing composition, the oxidizing composition comprising a permanganate selected from the group consisting of sodium permanganate, potassium permanganate and mixtures thereof, a binder/coating agent selected from the group consisting of an alkali metal silicate, alkali metal aluminate and mixtures thereof, and a filler, the permanganate being distributed throughout the pellets, the permanganate being distributed throughout the pellets, and wherein the pervious container is effective for permitting the flow of the substantially aqueous stream through the container to permit the stream to disintegrate the pellets and effect a timed release of the permanganate into the water to oxidize the hydrogen sulfide and the size of the pellets, the amounts of permanganate, binder/coating agent and filler being balanced to effect a timed release of permanganate into the water of from about 0.5 to about 10 pounds of permanganate per day.

19. A method as recited in claim 18 wherein the oxidizing composition comprises from about 60 to about 80 weight percent the permanganate, from about 10 to about 20 weight percent of the binder/coating agent selected from the group consisting of an alkali metal silicate, alkali metal aluminate and mixtures thereof, from about 10 to about 20 weight percent of a filler.

20. A method as recited in claim 19 wherein the filler is selected from the group consisting of diatomaceous earth, talc, ground silica, zeolite and clay.

* * * * *